(12) United States Patent  
Urbach

(10) Patent No.: US 8,847,791 B1  
(45) Date of Patent: Sep. 30, 2014

(54) SYSTEMS AND METHODS FOR DETERMINING PARKING DIFFICULTY OF SEGMENTS OF A GEOGRAPHIC AREA

(75) Inventor: Shlomo Reuben Urbach, Rehovot (IL)

(73) Assignee: Google Inc., Mountain View, CA (US)

( * ) Notice: Subject to any disclaimer, the term of this patent is extended or adjusted under 35 U.S.C. 154(b) by 416 days.

(21) Appl. No.: 13/314,908

(22) Filed: Dec. 8, 2011

(51) Int. Cl.  
*B60Q 1/48* (2006.01)

(52) U.S. Cl.  
USPC ............... 340/932.2; 340/988; 340/995.1; 340/995.14; 701/400; 701/408

(58) Field of Classification Search  
CPC .... G01C 21/3685; G01C 21/00; G01C 21/26; G01C 21/28; G01C 21/32; G01C 21/34; G01C 21/3407; G01C 21/3605; G08G 1/00; G08G 1/01; G08G 1/0104; G08G 1/0108; G08G 1/0112; G08G 1/012; G08G 1/0125; G08G 1/0129; G08G 1/0133; G08G 1/065; G08G 1/14; G08G 1/141; G08G 1/143; G08G 1/144; G08G 1/145; G08G 1/147; B60W 2550/40; B60W 2550/402; B60W 2550/406  
USPC .............. 340/932.2, 933, 934, 935, 988–996; 701/400–541  
See application file for complete search history.

(56) References Cited

U.S. PATENT DOCUMENTS

| | | | | |
|---|---|---|---|---|
| 5,910,782 | A * | 6/1999 | Schmitt et al. | 340/995.12 |
| 6,426,708 | B1 * | 7/2002 | Trajkovic et al. | 340/932.2 |
| 6,694,259 | B2 * | 2/2004 | Curbow et al. | 701/523 |
| 6,885,311 | B2 * | 4/2005 | Howard et al. | 340/932.2 |
| 6,885,312 | B1 * | 4/2005 | Kirkpatrick | 340/932.2 |
| 7,253,747 | B2 | 8/2007 | Noguchi | |
| RE40,013 | E | 1/2008 | Quinn | |
| 7,474,232 | B2 | 1/2009 | Chen et al. | |
| 7,516,010 | B1 | 4/2009 | Kaplan et al. | |
| 7,538,690 | B1 | 5/2009 | Kaplan et al. | |
| 7,805,239 | B2 | 9/2010 | Kaplan et al. | |
| 7,936,284 | B2 | 5/2011 | Levine et al. | |
| 8,217,806 | B2 * | 7/2012 | Kim | 340/932.2 |

(Continued)

FOREIGN PATENT DOCUMENTS

| WO | 2009156185 A1 | 12/2009 |
|---|---|---|
| WO | 2010081545 A1 | 7/2010 |

OTHER PUBLICATIONS

Mathur, Suhas, et al., "ParkNet: drive-by sensing of road-side parking statistics", Jun. 15-18, 2010, pp. 123-136.

(Continued)

*Primary Examiner* — Steven Lim  
*Assistant Examiner* — Ryan Sherwin  
(74) *Attorney, Agent, or Firm* — Bracewell & Giuliani LLP

(57) ABSTRACT

Provided are systems and methods for determining the parking difficulty of segments of a geographic area. A system may include portable computers and vehicle navigation systems traversing segments of a geographic area. Location tracks may be received corresponding to the paths of the vehicles. The location tracks may be evaluated to determine if they are from a vehicle searching for parking. Some segments of the searching-for-parking location tracks may be included in a circle event, and the number circle events that include a segment may indicate the difficulty of parking in that segment. The parking difficulty may be expressed as a parking difficulty index and may be transmitted to a computer for view on an interactive map or for use in determining directions to a destination.

17 Claims, 11 Drawing Sheets

(56) References Cited

U.S. PATENT DOCUMENTS

| | | |
|---|---|---|
| 8,700,314 B2 * | 4/2014 | Vavrus et al. .............. 701/410 |
| 2004/0107048 A1 | 6/2004 | Yokota |
| 2005/0253753 A1 | 11/2005 | Lalik et al. |
| 2005/0280555 A1 | 12/2005 | Warner |
| 2006/0287818 A1 | 12/2006 | Okude et al. |
| 2007/0069923 A1 | 3/2007 | Mendelson |
| 2009/0179776 A1 | 7/2009 | Holden |
| 2010/0042318 A1 | 2/2010 | Kaplan et al. |
| 2010/0302068 A1 * | 12/2010 | Bandukwala .............. 340/932.2 |
| 2011/0063132 A1 | 3/2011 | Trum |
| 2011/0133957 A1 | 6/2011 | Harbach |
| 2011/0140922 A1 | 6/2011 | Levy |
| 2012/0161986 A1 * | 6/2012 | Amir .......................... 340/932.2 |

OTHER PUBLICATIONS

International Search Report for PCT/IB2009/053179 dated Dec. 8, 2009; pp. 1-3.

* cited by examiner

SYSTEMS AND METHODS FOR DETERMINING PARKING DIFFICULTY OF SEGMENTS OF A GEOGRAPHIC AREA

BACKGROUND OF THE INVENTION

1. Field of the Invention

This invention relates generally to geographic data processing and, more particularly, to determining parking difficulty in a geographic area.

2. Description of the Related Art

Computer-implemented interactive maps are useful for a variety of purposes. For example, users may view interactive maps to learn about a geographic area, to identify the location of geographically-distributed objects (e.g., man-made structures or natural features) in a geographic area, search for categories of objects in a geographic area (e.g., restaurants in a given city), or identify routes between locations in a geographic area (e.g., driving directions from a current location to a desired destination). Typically, when using an interactive map, a user interacts with the map by viewing a particular geographic area or entering a destination to determine a route, and in some cases, receive navigation to the destination.

When traveling to a destination in a vehicle, a user may also desire to park the vehicle at or near the destination. However, parking data for a geographic area may be unavailable or inaccurate, and the interactive map may be unable to provide the user with an indication of the difficulty of parking at or near the destination. For example, parking data indicators may only provide users with an estimate of the number of vacancies in a parking garage or street parking. Moreover, such information may rely on other users to report vacancies and may be limited to specific geographic areas.

SUMMARY OF THE INVENTION

Various embodiments of methods and systems for determining the parking difficulty of a geographic area are provided herein. In some embodiments, a computer-implemented method for determining parking difficulty is provided. The method includes receiving, at a processor, a plurality of location tracks for a respective plurality of vehicles, each of the plurality of location tracks comprising a plurality of segments of a geographic area traversed by a respective one of the plurality of vehicles, determining, via the processor, a first index for each of the plurality of location tracks, the first index comprising a comparison of a first group of the plurality of segments and a second group of the plurality of segments of each of the plurality of location tracks, selecting, via the processor, a group of the plurality of location tracks based on the first index, and determining, via the processor, a circle event for each of the group of the plurality of location tracks, the circle event corresponding to the traverse of at least one of the plurality of segments by a respective one of the plurality of vehicles. The method further includes counting, via the processor, a number of circle events that includes a first selected segment of the plurality of segments and assigning, via the processor of the computer, a parking difficulty index for the first selected segment based on the number of circle events for the selected segment, the parking difficulty index representative of parking difficulty in the first selected segment.

In other embodiments, a non-transitory tangible computer-readable storage medium is provided. The non-transitory tangible computer-readable medium has executable computer code stored thereon, the code having a set of instructions that, when executed by a processor, causes the computer to receive, at a processor, a plurality of location tracks for a respective plurality of vehicles, each of the plurality of location tracks comprising a plurality of segments of a geographic area traversed by a respective one of the plurality of vehicles, determine, via the processor, a first index for each of the plurality of location tracks, the first index comprising a comparison of a first group of the plurality of segments and a second group of the plurality of segments of each of the plurality of location tracks, select, via the processor, a group of the plurality of location tracks based on the first index, and determine, via the processor, a circle event for each of the group of the plurality of location tracks, the circle event corresponding to the traverse of at least one of the plurality of segments by a respective one of the plurality of vehicles. The code further has a set of instructions that, when executed by a processor, causes the computer to count, via the processor, a number of circle events that includes a first selected segment of the plurality of segments and assign, via the processor of the computer, a parking difficulty index for the first selected segment based on the number of circle events for the selected segment, the parking difficulty index representative of parking difficulty in the first selected segment.

In yet other embodiments, a computer-implemented method for determining parking difficulty is provided. The method includes determining, via a processor, a first plurality of location tracks of a first plurality of vehicles that traverse a segment of a geographic map over a first duration, storing the first plurality of location tracks on a memory, determining, via the processor, a second plurality of location tracks of a second plurality of vehicles that traverse the segment of the geographic map over a second duration, storing the second plurality of location tracks on the memory and determining, via the processor, a parking difficulty index for the segment based on the first plurality of location tracks and the second plurality of location tracks.

In other embodiments, another computer-implemented method for determining parking difficulty is provided. The method includes receiving, at a processor, a destination in a geographic area, determining, at the processor, a parking area for the destination in the geographic area, the parking area comprising a plurality of segments of the geographic area, receiving, at the processor, parking difficulty data for one or more of the plurality of segments of the geographic area, wherein the parking difficulty data includes an indication of the difficulty of parking in the one or more segments, and instructing the computer to display the parking difficulty data for the one or more of the plurality of segments on an interactive map on a display of the computer.

In yet other embodiments, a non-transitory tangible computer-readable storage medium is provided. The non-transitory tangible computer-readable medium has executable computer code stored thereon, the code having a set of instructions that, when executed by a processor, causes the computer to receive, at a processor, a destination in a geographic area, determine, at the processor, a parking area for the destination in the geographic area, the parking area comprising a plurality of segments of the geographic area, receive, at the processor, parking difficulty data for one or more of the plurality of segments of the geographic area, wherein the parking difficulty data includes an indication of the difficulty of parking in the one or more segments, and instruct the computer to display the parking difficulty data for the one or more of the plurality of segments on an interactive map on a display of the computer.

Figure 1:
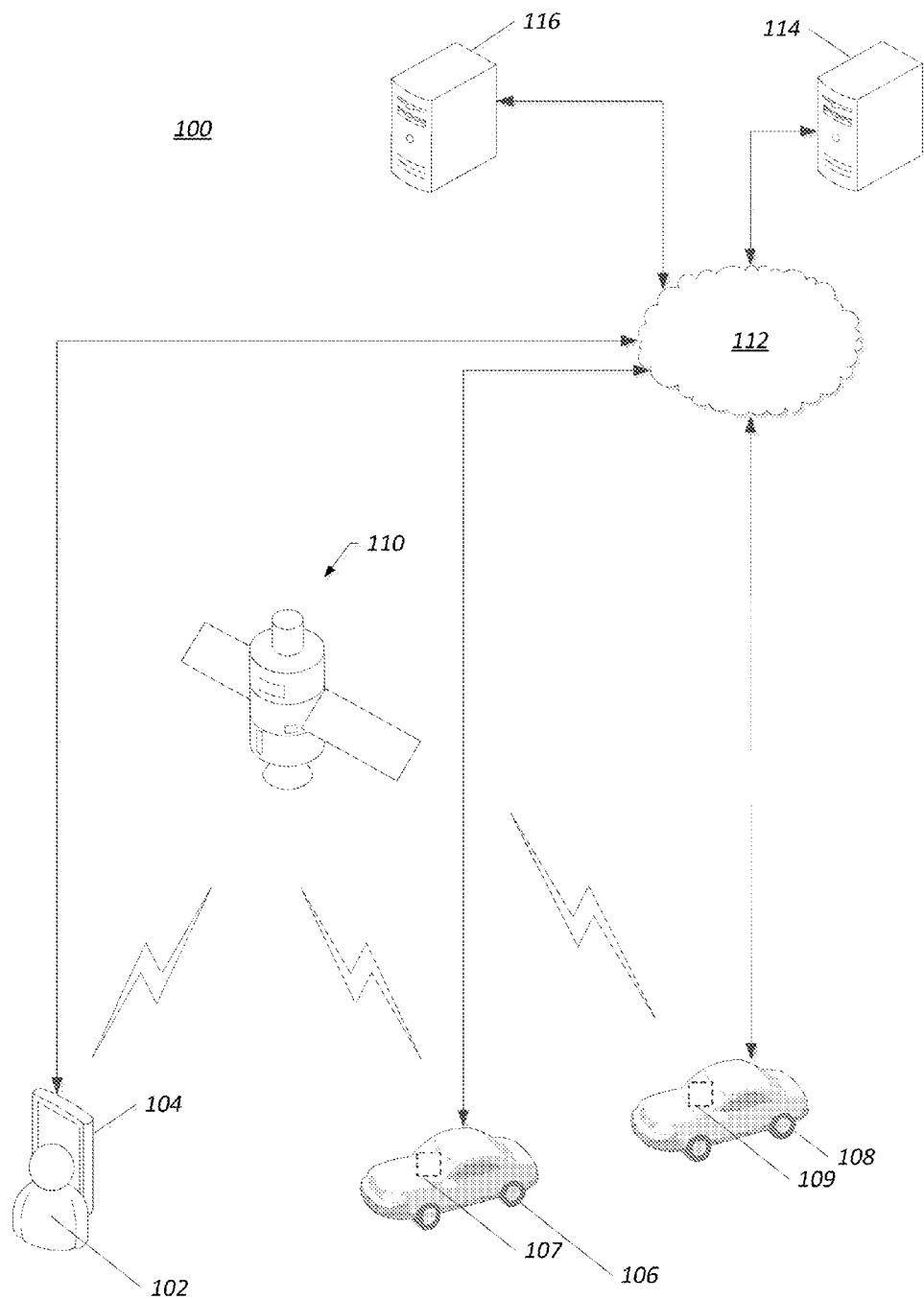
FIG. 1 is a schematic diagram that illustrates a system in accordance with embodiments of the present technique.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

As discussed in more detail below, provided in some embodiments are systems and methods for determining parking difficulty in a geographic area. A geographic area may be divided into segments (e.g., portions of streets, streets, city blocks, etc.) each having parking difficulty data. In some embodiments, location tracks corresponding to the paths taken by the vehicles in the geographic area may be received from portable computers and vehicle navigation systems in communication with satellite-based or inertial navigation systems. The location tracks corresponding to those vehicles searching for parking may be identified, such as by comparing a number of segments of the location track traversed once to a number of segments of the location track traversed multiple times. One or more segments of each such location tracks may be a part of a vehicle's search for parking (also referred to as a "circle event"). The parking difficulty for a segment may be determined by counting the number of circle events for the segment.

FIG. 1 is a schematic diagram that illustrates a system 100 in accordance with some embodiments. As shown in FIG. 1, the system 100 may include a user 102 interacting with a computer, e.g., portable computer 104, and vehicles 106 and 108. The portable computer 104 may include laptop computers, tablet computers, smartphones, personal digital assistants, etc., and may include a receiver for a satellite-based navigation system 110, such as a Global Positioning System (GPS) receiver. The vehicles 106 and 108 may include automobiles, motorcycles, buses, commercial vehicles, etc. The vehicles 106 and 108 may also include computers, e.g., vehicle navigation systems 107 and 109 respectively, which may also include receivers for the satellite-based navigation system 110, such as GPS receivers. The vehicle navigation systems 107 and 109 may be permanently integrated in each of the vehicles 106 and 108, or the systems 107 and 109 may be standalone (e.g., portable) navigation system removable from the vehicles 106 and 108. In some embodiments, a user in a vehicle (e.g., vehicle 106) may use a portable computer (e.g., portable computer 104), a vehicle navigation system (e.g., vehicle navigation system 105), or both to view interactive maps, find destinations, determine routes to destinations, and receive driving directions (e.g., visual or audio navigation) to destinations.

The portable computer 104, and the vehicle navigation systems 107 and 109, may be in communication with satellites of the aforementioned satellite-based navigation system 110 and with a network 112. For example, as the portable computer 104 and the vehicles 106 and 108 traverse geographic areas, the position of the portable computer 104 and the vehicle navigation systems 107 and 109 (and the vehicles 106 and 108) on a geographic map may be determined via communication with the satellite-based navigation system 110. The position may be stored on memories of the portable computer 104 and the vehicle navigation systems 107 and 109 and, as described further below, may be transmitted over the network 112.

The portable computer 104 and the vehicle navigation systems 107 and 109 may be in communication with the network 112, such as through a network interface having a cellular antenna, a wireless Ethernet antenna, etc. In some embodiments, the network 112 may include multiple networks, such as a wireless Ethernet network, a cellular network, or other wireless networks. Moreover, it should be appreciated that the portable computer 104, the vehicle navigation system 107, and the vehicle navigation system 109 may each communicate over a different network. For example, the portable computer 104 may communicate over a wireless Ethernet network, the vehicle navigation system 107 may communicate over a wireless Ethernet network, and the vehicle navigation system 109 may communicate over a cellular network.

The portable computer 104 and vehicle navigation systems 107 and 109 may communicate with computers 114 and 116 via the network 112. In some embodiments, the computer 114, the computer 116, or both may be a part of a data center or distributed computing network. In some embodiments, the computer 114 may be a server and may have or communicate with a database, and computer 116 may be a desktop computer or laptop computer that communicates with and accesses data from the computer 114, such as over the World Wide Web (WWW). In other embodiments, for example, the computer 114 may be a part of a geographic information system (GIS). As described further below, the portable computer 104 and vehicle navigation systems 107 and 109 may transmit their present location, as determined via the satellite-based navigation system 110, to the computer 114 for processing in accordance with the techniques described below. In other embodiments, the location of the portable computer 104 and vehicle navigation systems 107 and 109 may be determined with assistance of data received from the network 112, such as by assisted GPS (A-GPS). In other embodiments, the position of the location of the portable computer 104 and vehicle navigation systems 107 and 109 may be determined solely from data received from the network 112. Moreover, as described further below, the vehicle locations may be anonymized, either before or after transmission, so that vehicle locations are not associated with individual user identities or user devices (e.g., portable computers, vehicle navigation systems, etc.). Additionally, in some embodiments, the vehicle location data may not be collected unless a user has expressly provided permission after receiving notice of the collection of such data and how it is used.

Figure 2:
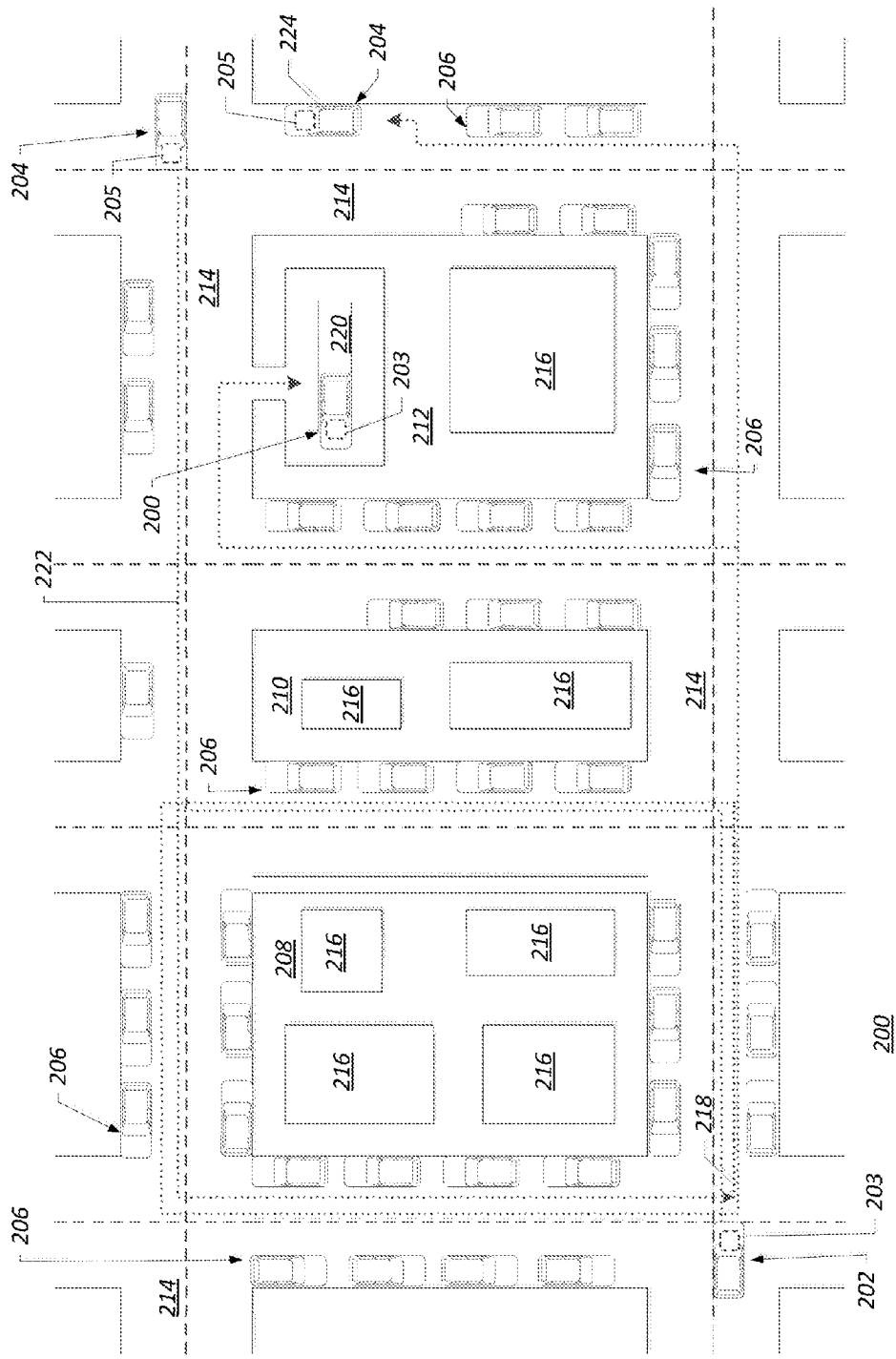
FIG. 2 is a schematic diagram of a geographic map and the paths of two vehicles in accordance with embodiments of the present technique.

FIG. 2 depicts a geographic map 200, such as a portion of a city, town, etc., depicting two vehicles 202 and 204 parking in different parking spots of the map 200. As shown in FIG. 2, the map 200 depicts numerous other vehicles 206 occupying potential parking spots around various city blocks, e.g., blocks 208, 210, and 212, formed by the intersections of streets 214. The blocks 208, 210, and 212 may include buildings 216 and other structures that may be destinations for the vehicles 202, 204, and 206. For example, the users of each of the vehicles 202 and 204 may travel to a destination in blocks 208, 210, or 212. Moreover, as described above, the vehicle 202 may include a vehicle navigation system 203 and the vehicle 204 may include a vehicle navigation system 205.

As further shown in FIG. 2, the vehicle 202 may follow a path 218 to a parking lot 220. Similarly, vehicle 204 may follow a path 222 to a parking spot 224. During traversal of the path 218, the vehicle navigation system 203 may store and transmit the location of the vehicle 202 on the path 218. This location data may be referred to as a "location track" of vehicle 202, and the location track for vehicle 202 corresponds to the path 218 taken by the vehicle. Similarly, during traversal of the path 222, the vehicle navigation system 204 may store and transmit the location of the vehicle 204 on the path 222. This location data may be referred to as a location track of vehicle 204, and the location track for vehicle 204 corresponds to the path 222 taken by the vehicle. In other embodiments, the location track may be determined and received from other sources, such as aerial surveillance.

Each of the paths 218 and 222 (illustrated in further detail in FIGS. 3A and 3B respectively) may include multiple traversals of the same streets 214. For example, as shown in FIG. 2, when the user of vehicle 202 is searching for a parking spot, the path 218 of the vehicle 202 may traverse around the city block 208 multiple times. Because no parking spots are available around the block 208 (i.e., all parking spots are occupied by vehicles 206), the vehicle 202 may search for parking spots around portions of blocks 210 and 212 before finding a vacant parking spot in the parking lot 220. Similarly, when the user of the vehicle 204 is searching for a parking spot, the path 222 of the vehicle 204 may also traverse around the city block 208 multiple times. Here again, because no parking spots are available around the block 208 (i.e., all parking spots are occupied by vehicles 206), vehicle 202 may search for parking spots around portions of blocks 210 and 212 before finding the parking spot 224 on one of the streets 214. Based on the paths 218 and 222 of vehicles 202 and 204 described above, the vehicles 202 and 204 may colloquially be referred to as "circling for parking."

Figure 3A:
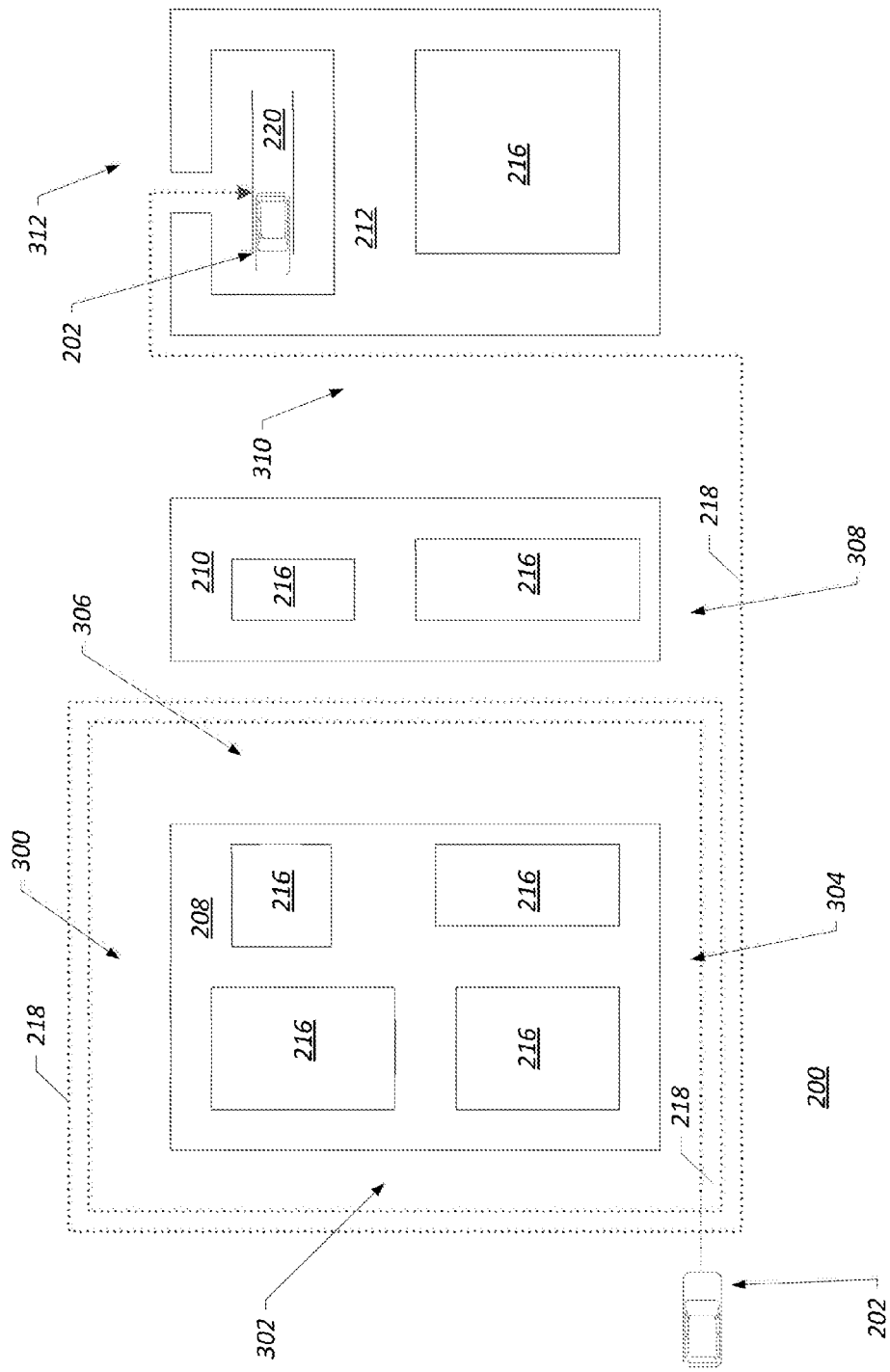
FIGS. 3A and 3B are schematic diagrams of the geographic map of FIG. 2 each depicting a path of a vehicle in accordance with embodiments of the present technique.
Figure 3B:
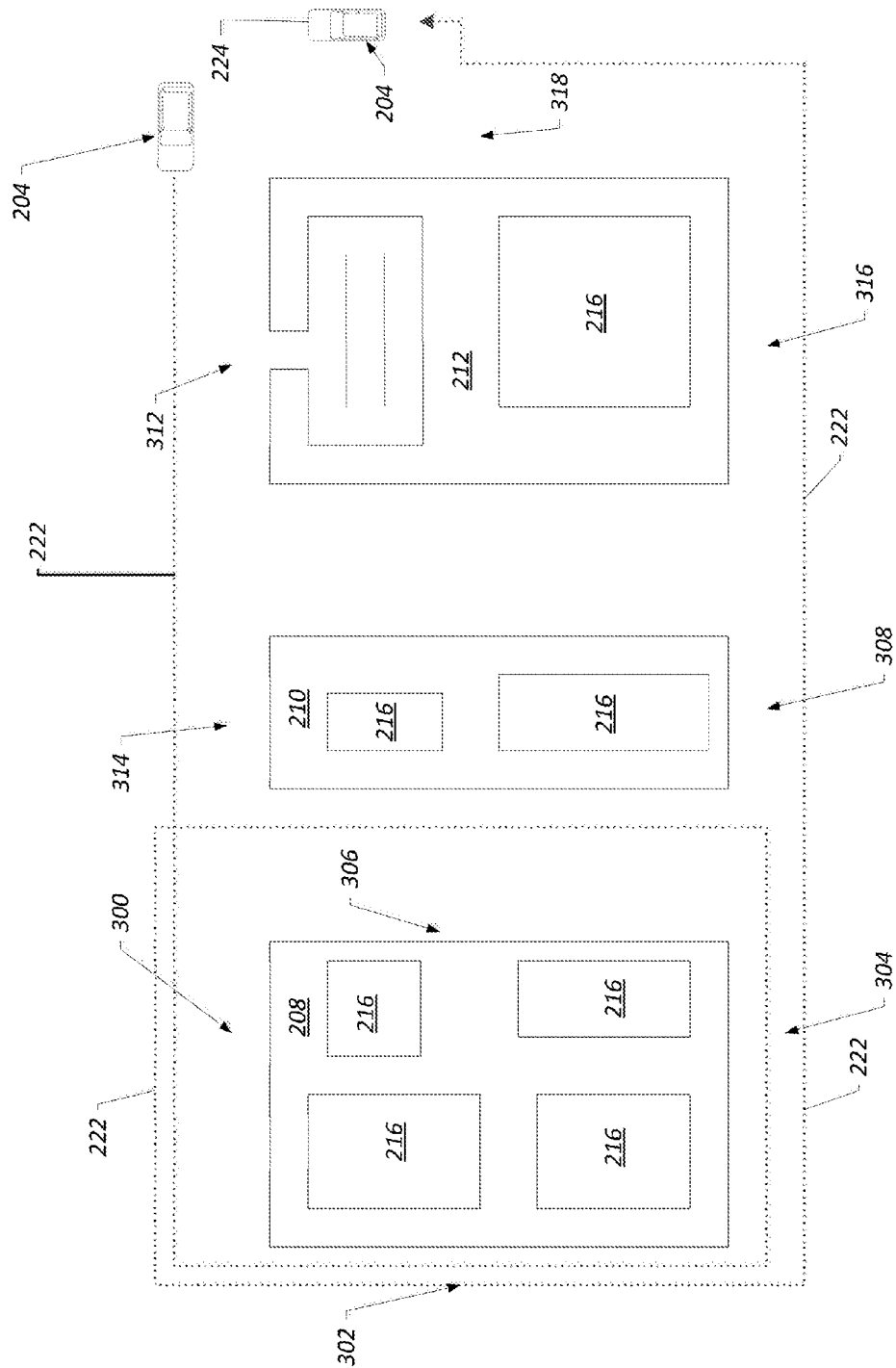

FIGS. 3A and 3B depict each path 218 and 222 with portions of the geographic map 200 removed for clarity. As show in FIGS. 3A and 3B, the geographic map 200 may be divided into segments. In the depicted embodiment, for example, each segment may correspond to a portion of the streets 214, such as a portion of a street 214 encompassing one side of a city block (e.g., one of city blocks 208, 210, and 212). In other embodiments, the segments may represent larger or smaller portions than that illustrated in FIGS. 3A and 3B, such as less than a side of a city block, multiple sides of a city block, multiple sides encompassing multiple city blocks, a street, multiple streets, etc. As shown in FIG. 3A, each segment traversed by the path 218 is identified and includes the illustrated segments 300, 302, 304, 306, 308, 310, and 312.

By identifying the segments of a geographic map, such as the segments of map 200, the number of times a path traverses a segment may be identified from the location track of a vehicle. When the vehicle 202 is searching parking, the path 218 traverses the identified segments in the following order: segment 304→segment 306→segment 300→segment 302→segment 304→segment 306→segment 300→segment 302→segment 304→segment 308→segment 310→segment 312. Based on the location track transmitted from the vehicle navigation system 203, the path 218 of the vehicle may be determined to traverse segment 304 three times, segments 306, 300, and 302 twice, and segments 308, 310, and 312 once. As described further below, the segments traversed multiple times, as compared to the segments only traversed once, may provide an indication that the vehicle 202 is searching for parking. The multiple traversals of each segment may then provide an indication of the difficulty of finding parking in a particular segment or multiple segments traversed near the particular segment.

As shown in FIG. 3B, each segment traversed by the path 222 of the vehicle 204 is identified and includes the identified segments 312, 314, 300, 302, 304, 306, 308, 316, and 318. As mentioned above, by identifying the segments of the geographic map 200, the number of times the path 222 traverses a segment may be identified from the location track. For example, when the vehicle 204 is searching for parking, the path 222 traverses the identified segments in the following order: segment 312→segment 314→segment 300→segment 302→segment 304→segment 306→segment 300→segment 302→segment 304→segment 308→segment 316→segment 318. Based on the location track transmitted from the vehicle navigation system 205, the path 222 of the vehicle 204 traverses segments 300, 302, and 304 twice, and segments 312, 314, 306, 308, 316, and 318 once. As mentioned above and as described further below, the segments traversed multiple times, as compared to the segments only traversed once, may provide an indication that the vehicle 204 is searching for parking, and the multiple traversals of each segment may then provide an indication of the difficulty of finding parking in a particular segment or multiple segments traversed near the particular segment.

In some embodiments, determination of parking difficulty from vehicles' location tracks may include two determinations: 1) determining if a location track is from a vehicle searching for parking; and 2) for a segment, determining how many such location tracks traverse that segment. As described further below, the parking difficulty for a segment may be expressed in different ways, such as by an index that may be normalized to different parameters. The parking difficulty may also be indicated on an interactive map of a geographic area.

Initially, each location track of a vehicle may be evaluated to determine if the location track is from a vehicle searching for parking. Such location tracks may be described as including a "circle event." As used herein, the term "circle event" is not limited to a geometric circle, but may include any portion of a location track that may indicate a vehicle is searching for parking. For example, a "circle event" of a location track may include the portions of the location track that traverse a segment more than once (e.g., such as traversing around a city block multiple times, traversing a street multiple times, etc.). If a location track includes a circle event near the end of the location track (i.e., near the end of the path in which a vehicle finds a parking spot), such a circle event may indicate that a vehicle is searching for parking. Multiple location tracks may be used to determine how many circle events include a specific segment, thus indicating how many vehicles traversed the segment while searching for parking. Consequently, multiple circle events for a segment may indicate that parking in that segment is of greater difficulty than other segments (e.g., segments that are only traversed once and segments that are at the end of a location track). In some embodiments, multiple circle events for a particular segment may be used as an indicator for additional segments of the location track, e.g., intermediate segments near the particular segment.

In some embodiments, a "searching-for-parking" index may be determined for each location track to identify the location tracks that are from vehicles searching for parking (i.e., those location tracks having circle events). The searching-for-parking index may be determined from Equation 1 below:

$$F = \frac{k - \text{unique}(T_k)}{k} \quad (1)$$

where:

k=a select number of segments in a path (location track);
$T_k$=the last k segments in a path (location track);
unique($T_k$)=the last k segments only traveled once; and
F=the searching-for-parking index for a path (location track).

The select number of segments k may be selected based on different criteria. In some embodiments, k may a constant number of segments (e.g., the last number of segments of a location track). In other embodiments, k may be the number of segments traversed during a duration of time (e.g., the number of segments traversed in the last 15 minutes of a location track). In yet other embodiments, k may be selected such that F is maximal. Moreover, some embodiments may use any combination of the above determinations for k. A location track may be considered to be from a vehicle searching for parking if the index F is above a threshold. Using the paths 218 and 222 as examples, the determination of F for the location tracks of vehicles 202 and 204 will be described below. Regarding vehicle 202, as mentioned above, path 218 of FIG. 3A includes seven segments at the end of the path. Of the seven segments, segments 308, 310, and 312 are each traversed once. Thus, three segments of path 218 are unique. Based on these segments, F may be determined according to Equation 2 below:

$$F = \frac{7-3}{7} = \frac{4}{7} \quad (2)$$

F may be compared to a threshold to determine if the location track is from a vehicle searching for parking. For example, in some embodiments, if F is greater than one-fourth, as in the present example, F may indicate that the location track for vehicle 202 is a location track from a vehicle searching for parking. Thus, this location track may be used in determining parking difficulty for certain segments of a geographic area.

In another example, for vehicle 204, path 222 of FIG. 3B includes nine segments. Of these nine segments, segments 312, 314, 306, 308, 316, and 318 are traversed once. Thus, six segments of path 222 are unique. Based on these segments, F may be determined according to Equation 3 below:

$$F = \frac{9-6}{9} = \frac{3}{9} = \frac{1}{3} \quad (3)$$

F may then be compared to a threshold. For example, if F is greater than one-fourth, as shown in Equation 2, F may indicate that the location track for vehicle 204 is a track from a vehicle searching for parking. Here again, this location track may be used in determining parking difficulty for certain segments of a geographic area Once the searching-for-parking location tracks are identified, one or more segments of the path of each searching-for-parking location track may be identified as including a circle event (also referred to as "scoring" a circle event). The scoring of circle events for a segment may be based on identifying if the segment is actually part of a vehicle's attempt to find parking. In a searching-for-parking location track, those segments traversed by more than once or at the end of the track may indicate these segments are a part of a vehicle's attempt to find parking. For example, each of the last m segments of a path may be considered as including a circle event. In some embodiments, m may be defined as the segments of a path traversed more than once. For example, with regard to path 218, there are m=4 segments traversed more than once: segments 300, 302, 304, and 306. Thus, each of segments 300, 302, 304, and 306 may be considered as including ("scoring") a circle event. Similarly, with regard to path 222, there are m=3 segments traversed more than once: segments 300, 302, and 304. Thus, each of segments 300, 302, and 304 may be considered as including ("scoring") a circle event.

In some embodiments, m may be defined based on other parameters. For example, in some embodiments, m may depend on $T_k$ and the actual distances traveled along a path. In other embodiments, m may depend on the number of segments before the final segment of a path. For example, m may be equal to segments k-1, k-2, k-3, etc. In other embodiments, any number of these parameters may be combined to determine m, such as combining the number of segments of a path and the distance traveled along those segments.

After identification of m segments having circle events, the parking difficulty of each segment of a geographic area may be determined. In some embodiments, the parking difficulty of a segment may be determined as a parking difficulty index based on the number of circle events for a segment. For example, for each s segment, the parking difficulty index may be determined by Equation 4:

$$PD_s = \sum_1^n CE_s \quad (4)$$

where:
$PD_s$=the parking difficulty index for a segment s;
$CE_s$=a value of 1 if a location track has a circle event that includes the segment s or a value of 0 otherwise; and
n=the number of location tracks.

For example, using the examples referred to above, there are two location tracks (from paths 218 and 222) determined from vehicles 202 and 204. As noted above, segment 300 may include a circle event from path 218 and a circle event from path 222. Thus, using Equation 4, the parking difficulty index for segment 300 equals 2. In another example, segment 306 only includes a single circle event from path 218. Accordingly, for the two location tracks, the parking difficulty index for segment 306, using Equation 4, equals 1.

In other embodiments, the parking difficulty index may be normalized to different parameters. For example, in some embodiments, the parking difficulty index may be normalized to the number of location tracks n, the number of vehicles (e.g., total vehicles in a geographic area, total vehicles that traversed a segment s, etc.), the number of segments in a geographic area, the number of select segments k, the last T minutes of a track, etc. For example, the parking difficulty index may be normalized according to the number of location tracks as shown below in Equation 5:

$$PD_s = \frac{\sum_1^n CE_s}{n} \quad (5)$$

Similarly, the parking difficulty index may be normalized according to the number of vehicles that traversed a segment, as shown below in Equation 6:

$$PD_s = \frac{\sum_1^n CE_s}{v_s} \quad (6)$$

where:
$v_s$=the number of vehicles that traverse the segment s.

In some embodiments, as described below, the location tracks may be collected over a period of time, e.g., days, weeks, months, years, etc., to determine the parking difficulty of segments of a geographic area. Additionally, in some embodiments, data for multiple segments may be aggregated to determine the parking difficulty for a region that includes multiple segments, such as a city block, a city, a metropolitan area, or any other geographic area. Moreover, in some embodiments, the data for a segment may be aggregated for a specific time period, such as for specific hours of a day (e.g., rush hours of a day), specific days of a week (e.g., weekdays or weekends), specific weeks of a month, specific weeks of a year (e.g., weeks during a holiday season, a shopping season, etc.) or any other specific time period. Moreover, some embodiments may combine any or all of the above techniques to arrive at a desired model of parking difficulty for a segment or geographic area. FIGS. 4-8 depict various processes illustrating the embodiments mentioned above.

Figure 4:
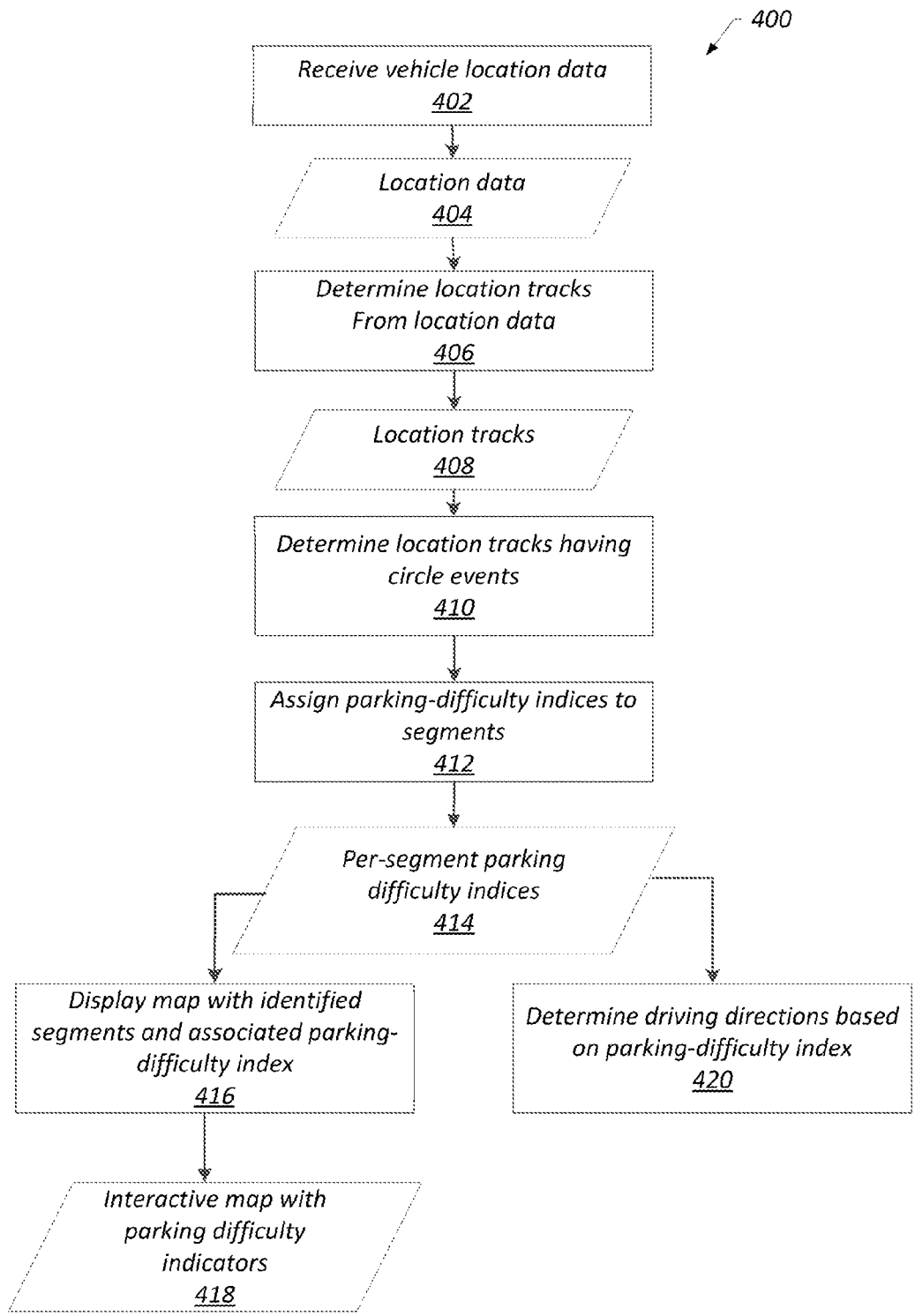
FIG. 4 is a block diagram of a process for determining parking difficulty in a geographic area in accordance with embodiments of the present technique.

FIG. 4 depicts an embodiment of a process 400 for determining parking difficulty of a geographic area. It should be appreciated that some or all steps of the process 400 may be implemented as executable code instructions stored on non-transitory tangible computer-readable media and executed by a processor (e.g., one or more processors), in parallel or in series. In some embodiments, various steps of the process 400 may be distributed among different computers, such as the portable computer 104 or vehicle navigation systems 103 and 105, the computer 114, or other computers. Initially, vehicle location data may be obtained in real-time or from stored data (block 402), such as from the portable computer 104 of a passenger or driver of a vehicle, or from the vehicle navigation systems 107 and 109. The vehicle location data (block 404) may be analyzed (block 406) to determine location tracks for each vehicle from location data. As discussed above, each location track may correspond to a path of a vehicle traversing segments of a geographic area. Moreover, in some embodiments, multiple location tracks for multiple vehicles over a time period may be collected and stored.

Further, some embodiments may include filtering (e.g., noise reduction), smoothing, or other processing of the vehicle location data (block 404) before or after analyzing the data.

Although vehicle locations and location tracks can be determined in any suitable way, the vehicle location data is used and processed in a way that respects users' privacy. For example, location data such as location tracks may not be collected unless a user has expressly provided permission after receiving notice of the collection of such data and how it is used. Additionally, the location data can be stored and processed in a way that protects user privacy. For example, location data such as location tracks can be discarded after use, and if stored the location data can be anonymized so that vehicle locations and location tracks are not associated with individual user identities or user devices (e.g., portable computers, vehicle navigation systems, etc.).

Next, the location tracks having circle events may be identified (block 410), such as in the process described below in FIG. 5. After determination of these location tracks, parking difficulty indices may be assigned to segments of the location tracks (block 412), such as in the process described below in FIG. 6, to provide per-segment parking difficulty indices 414. In some embodiments, the per-segment parking difficulty indices may be transmitted over a network to a computer, such as the portable computer 104, the vehicle navigation systems 107 and 109, or the computer 112. For example, a user of a computer may enter a destination on or view a region of an interactive map. In response, the computer may receive, among other data, the parking difficulty indices for various segments of the geographic area that includes the destination or region.

Next, an interactive map having identified segments and associated parking difficulty indices may be displayed on the computer (block 416). For example, parking difficulty indicators may be displayed as text, graphics, or a combination thereof, on the interactive map (block 418). In other embodiments, as described below in FIG. 7, directions may be determined based on the parking difficulty indices (block 420). For example, the parking difficulty indices for segments located near a destination may be considered when calculating a route and providing directions to the destination.

Figure 5:
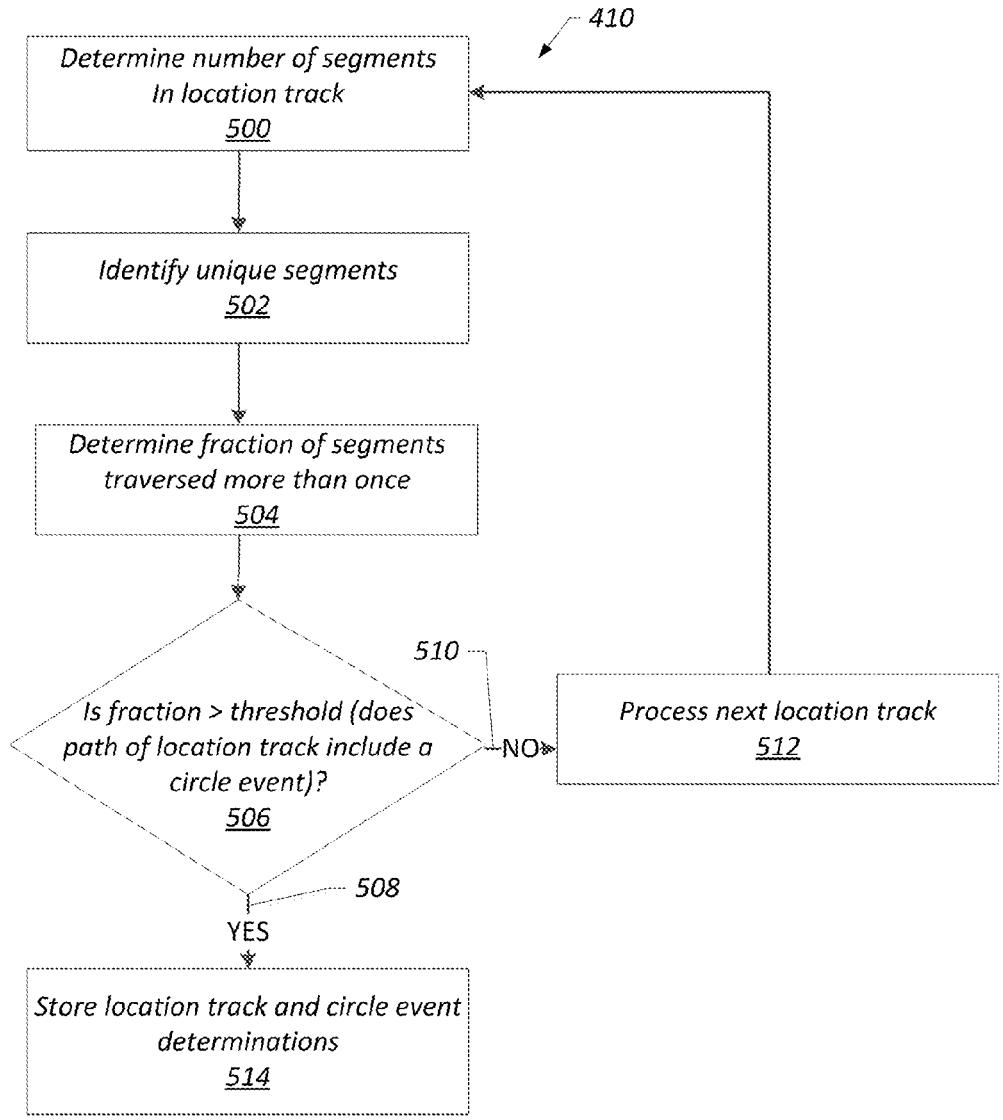
FIG. 5 is a block diagram of a process for determining circle events in location tracks in a geographic area in accordance with embodiments of the present technique.

FIG. 5 depicts the process 410 for identifying searching-for-parking location tracks in accordance with some embodiments. It should be appreciated that some or all steps of process 410 may be implemented as executable code instructions stored on non-transitory tangible computer-readable media and executed by a processor (e.g., one or more processors), in parallel or in series. Initially, the number of segments of a location track may be determined (block 500). Each segment of a location track, from the start of a location track (i.e., the start of a path) to the end of the location track (i.e., the end of a path), may be counted to obtain the total number of segments of a location track. Next, the unique segments of the location track may be identified (block 502). For example, in some embodiments, the unique segments may be those segments of a path only traversed once. In other embodiments, the unique segments may be based on the total number of segments of a location track, the number of segments before the last segment, or any other suitable parameters.

Next, the fraction of segments of the location track traversed more than once may be determined (block 504), such as by using Equation 1 discussed above. For example, the fraction may be determined as the searching-for-parking index F described above in Equation 1. In some embodiments, the determination may be repeated multiple times for different selections of segments (e.g., different "ends" of location tracks) to determine F (such as by determining a maximal F) Next, the fraction may be compared to a threshold (decision block 506) to determine if the location track is a searching-for-parking location track (i.e., if the location track includes a circle event). For example, if the fraction is greater than the threshold, the location track may be determined to be a searching-for-parking location track (line 508). If the fraction is less than the threshold the location track may be determined to not include a circle event (line 510), and the next location track may be processed (block 512). The determinations may be stored (block 514), such by storing the locations tracks identified as searching-for-parking location tracks. In other embodiments, all location tracks may be stored with an indication as to whether a location track includes a circle event or does not include a circle event and the segments of a location track that include a circle event.

Figure 6:
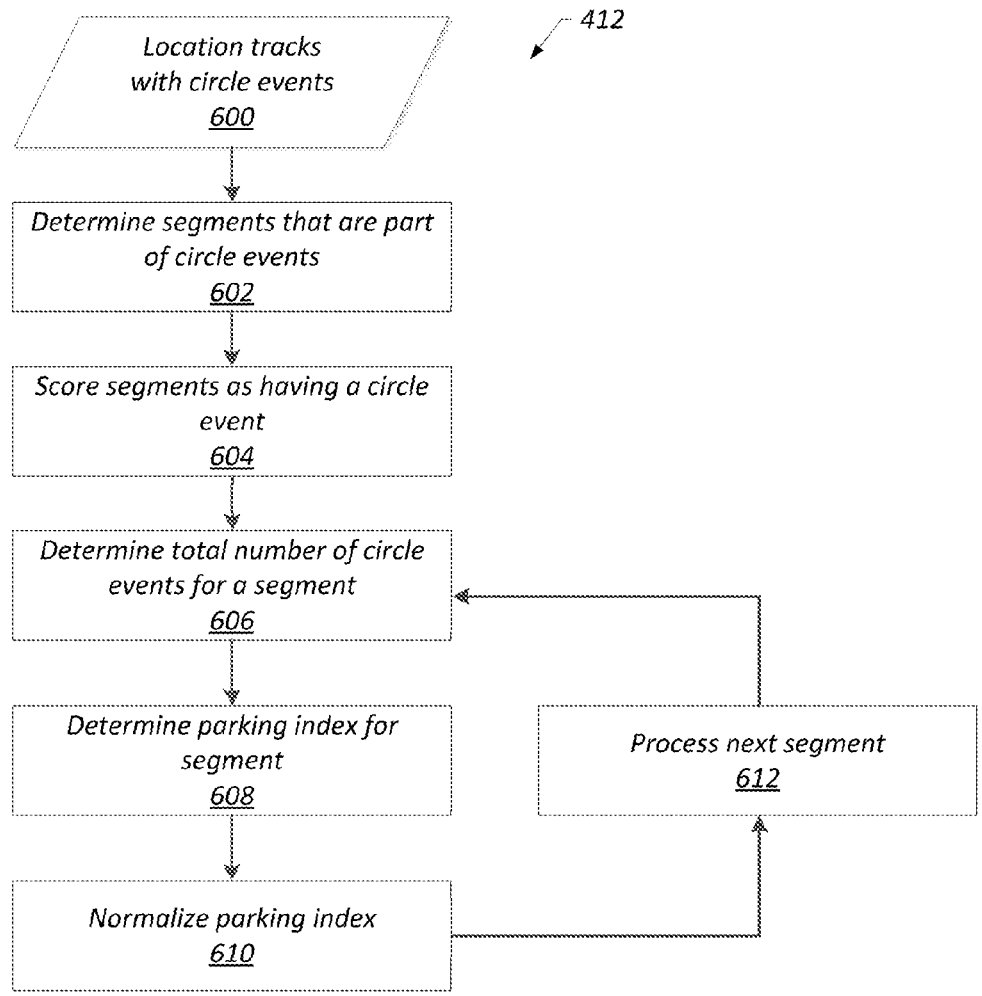
FIG. 6 is a block diagram of a process for assigning parking difficulty indices to segments of a geographic area in accordance with embodiments of the present technique.

FIG. 6 depicts a process 412 for assigning parking difficulty indices to segments in accordance with some embodiments. It should be appreciated that some or all steps of the process 412 may be implemented as executable code instructions stored on non-transitory tangible computer-readable media and executed by a processor (e.g., one or more processors), in parallel or in series. Initially, the location track data for the location tracks having circle events may be obtained (block 600), such as from the process described above in FIG. 5. After obtaining the location track data, for each location track the segments that are a part of a circle event may be determined (block 602). For example, as described above, m segments of a searching-for-parking location track may be determined to have a circle event. After such segments have been identified, each segment of the m segments of a location track may be "scored" as having a circle event (604). A segment may be evaluated to determine the total number of circle events for the segment (block 606), such as described above in Equation 5. Based on the number of circle events for a segment, the parking difficulty index for the segment may be determined (block 608). As also described above, in some embodiments the parking difficulty index may be normalized to different parameters (block 610), such as the number of location tracks, the number of vehicles, etc. After these determinations, the next segment of a circle event of a location track may be processed (block 612).

Figure 7:
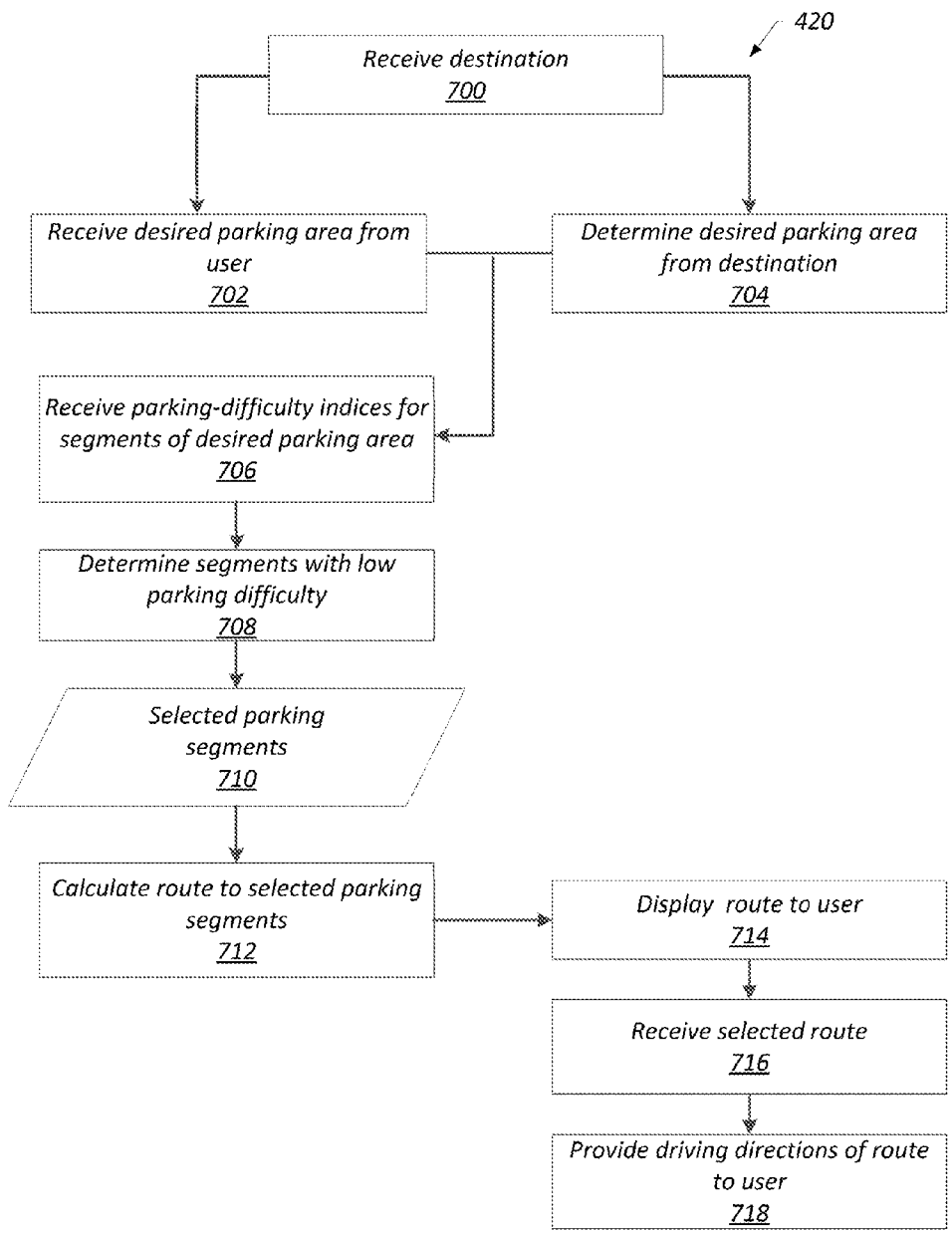
FIG. 7 is a block diagram of a process for determining driving directions based on parking difficulty data in accordance with embodiments of the present technique.

FIG. 7 depicts a process 420 for determining driving directions based on parking difficulty data (e.g., the previously determined parking difficulty indices) in accordance with some embodiments. It should be appreciated that some or all steps of the process 420 may be implemented as executable code instructions stored on non-transitory tangible computer-readable media and executed by a processor (e.g., one or more processors). Initially, a destination may be received (block 700), such as from user input (e.g., searching for and selecting a destination, entering a destination's name, coordinates, etc.) into a portable computer or vehicle navigation system. In some embodiments, the parking area for the destination may also be received (block 702). For example, a user may select segments near the destination from an interactive map and input the selected segments as the parking regions. In other embodiments, the selection may simply be a region on an interactive map, rather than specific segments, and all segments in this region may be selected for a parking area.

In other embodiments, the parking area for a destination may be determined from the destination's location (block 704). For example, all segments within a geographic radius or other area may be determined to be parking areas for a destination. In other embodiments, destinations may also be associated with specific segments, and these segments may be used as the parking areas for those destinations. Once the parking areas for a destination are determined, either from selected segments or from a determination of selected segments of a geographic area, the parking difficulty indices for the segments of the parking area may be received (block 706). Next, the segments having lower parking difficulty indices may be selected (block 708). For example, the lowest one, two, three, four, five, or more parking difficulty indices and associated segments, or any segment whose parking difficulty index is below some threshold, may be selected for the subsequently determined route, thus providing the selected parking segments (block 710).

Next, a route may be calculated to the selected parking segments (block 712). In some embodiments, a route may be calculated to each selected parking segment, so that multiple parking segments may each have a respective route. In such embodiments, a user may select one of the multiple routes for driving directions. In other embodiments, a single route may be calculated that traverses all selected parking segments. For example, such a route may traverse each parking segment at least once to enable a user to traverse the selected parking segments in the order determined by the route.

Next, a route may be displayed to a user (block 714), such as on a display of a portable computer or a vehicle navigation system. As described above, one or more routes may be displayed based on the type of calculation and selected parking segments. A selected route may then be received from a user (block 716). For example, a user may select from among multiple routes to the selected parking segments. In some embodiments, if only one route is displayed, a user's selection may confirm the route. Finally, directions to the selected parking segments based on the route may be provided to the user (block 718), such as by turn-by-turn navigation in audio, textual, or visual instructions, or any combination thereof.

Figure 8:
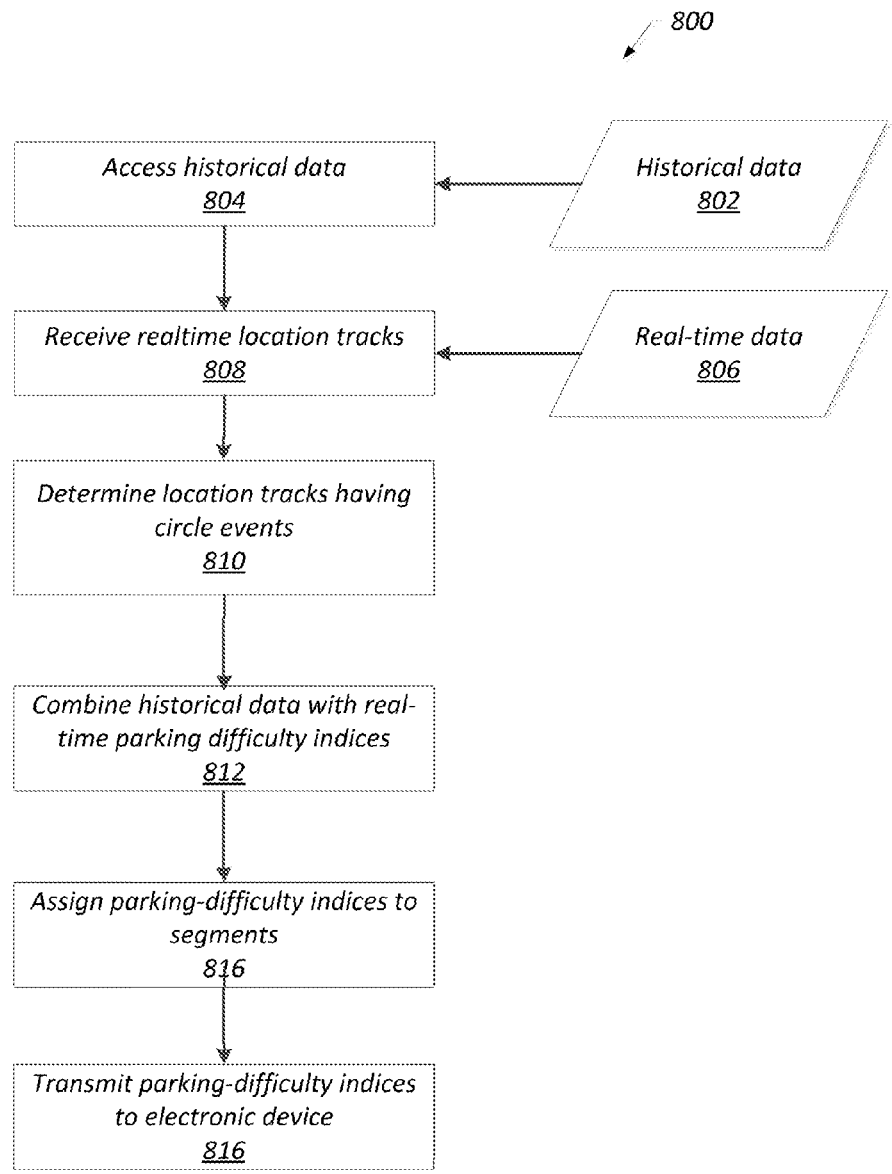
FIG. 8 is a block diagram of a process for determining parking difficulty of a geographic area in accordance with embodiments of the present technique.

FIG. 8 depicts a process 800 for determining parking difficulty data in accordance with some embodiments. It should be appreciated that some or all steps of the process 800 may be implemented as executable code instructions stored on non-transitory tangible computer-readable media and executed by a processor (e.g., one or more processors), in parallel or in series. Moreover, in some embodiments, various steps of the process 800 may be distributed among different computers, such as the portable computer 104 or vehicle navigation systems 103 and 105, the computer 114, or other computers. In such embodiments, as described further below, historical parking difficulty data for a geographic area may be combined with real-time parking difficulty data to improve the determination of parking difficulty for the geographic area. Initially, historical data (block 802) for a geographic area may be accessed (block 804). For example, the historical data may be stored in a database or other data structure, such as on the computer 114, and the historical data for a geographic area may be read from the database or other data structure. The historical data may include parking difficulty data determined in accordance with the techniques described above in FIGS. 4-6. Next, real-time location track data (block 806) may be obtained (block 808), such as from portable computers and vehicle navigation systems in vehicles traversing a geographic area. The real-time location track data may be obtained over a period of time, such as minutes, hours, etc., to provide enough data to adequately represent the real-time parking difficulty of a geographic area.

Next, those location tracks having circle events, (i.e., searching-for-parking location tracks) may be determined (block 810), such as by the process described above in FIG. 6. Next, these location tracks may be combined with the historical data (block 812), generating location tracks combined from the historical data and the real-time data. The combination may use any suitable weighting, such as by assigning the real-time data greater weight or less weight than the historical data or dynamically determining the weight based on the amount of real-time data available for a geographic area, segment, etc. Next, the parking difficulty indices for segments of a geographic area may be determined from the combined real-time and historical data (block 814). The determined parking difficulty indices may then be transmitted to a computer (block 816), such as the portable computer 104 or vehicle navigation systems 107 and 109, in response to a request for parking at a destination.

Figure 9:
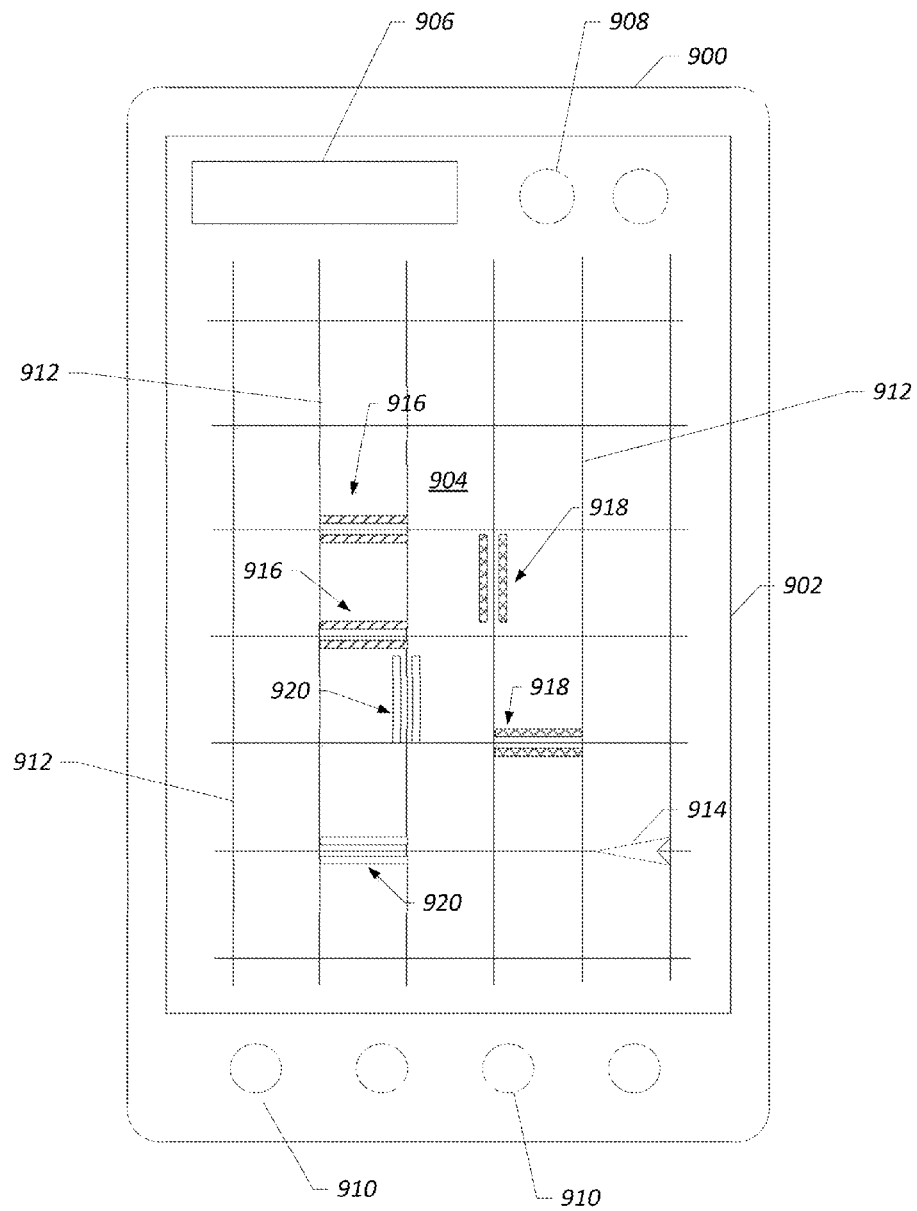
FIG. 9 is a schematic diagram of a portable computer displaying parking difficulty data in accordance with embodiments of the present technique.

FIG. 9 depicts a portable computer 900, such as smartphone, tablet computer, etc., displaying parking difficulty data in accordance with some embodiments. As shown in FIG. 9, the portable computer 900 includes a display 902 that may display an interactive map 904 of a geographic area, such as from a maps application, a website, or any other source of an interactive map. The display 902 may display, for example, a text entry field 906 and software buttons 908, enabling a user to interact with the interactive map 904 and the portable computer 900. For example, a user may type a destination into the text entry field 906 to search for a destination for display on the interactive map 904. The software buttons 908 may be context-sensitive buttons or other inputs that change according to the information displayed on the display 902. Additionally, the portable computer 910 may include physical inputs 910, such as buttons, switches, etc. For example, the physical inputs 910 may include a "Home" button that enables a user to exit the interactive map 904 and return to a home screen.

As shown in FIG. 9, the interactive map 904 includes streets 912. For example, the user may view a geographic area that includes the depicted streets 912, such as by zooming into the geographic area on the interactive map 904 or by searching for a destination located at or near the streets 912. Additionally, the interactive map 904 may include a pointer 914 depicting the present location of the portable computer 900, such as determined from a satellite-based positioning system.

Parking difficulty data determined using the techniques described above may be displayed on the interactive map 904. In some embodiments, a parking difficulty index for a segment (e.g., a portion of one of the streets 912) may be displayed in a color or other visual indicator based on the value of the index. For example, in some embodiments, the parking difficulty index may be compared to a threshold or a range, as a color or other visual indicator selected based on the comparison. As shown in FIG. 9, segments 916 may be displayed with a first visual indicator, as represented by the first cross-hatched section, based on the value of the parking difficulty indices for these segments. For example, if the parking difficulty indices for the segments 916 are above or below a threshold, or within a range (e.g., between a first threshold and a second threshold), the segments 916 may be depicted with the first cross-hatched section to indicate a specific parking difficulty for those segments. Similarly, the segments 918 may be displayed with a second visual indicator, as represented by the second cross-hatched section, based on the parking difficulty indices for those segments. Here again, the parking difficulty indices for the segments 918 may be compared to a threshold or a range and displayed with the appropriate visual indicator based on the comparison. Finally, as also shown in FIG. 9, the segments 920 may be displayed with a third visual indicator, as represented by the lack of cross-hatching, based on the parking difficulty indices for the segments 920 and the comparisons described above. In some embodiments, the indicators described above may be displayed only in the area near the destination, and may only be displayed when the vehicle is approaching the destination (e.g., if more current data becomes available as the vehicle nears the destination).

In some embodiments, the interactive map 904 may not display any visual indicator for those segments having suitable parking, i.e., having comparatively lower parking difficulty indices. Thus, a user of the portable computer 900 may navigate to those segments to optimize the search for parking. In other embodiments, the interactive map 904 may display additional visual indicators for those segments having comparatively lower parking difficulty, such as a highly visible indicator so that those segments are easily identifiable by a user. For example, the visible indicator for such segments may be a relatively bright color, a flashing indicator, enlargement of such segments on the interactive map 904, etc. In yet other embodiments, an audio indicator may alternatively or additionally be provided, such as when a vehicle traverses those segments having comparatively lower parking difficulty when near the destination.

Figure 10:
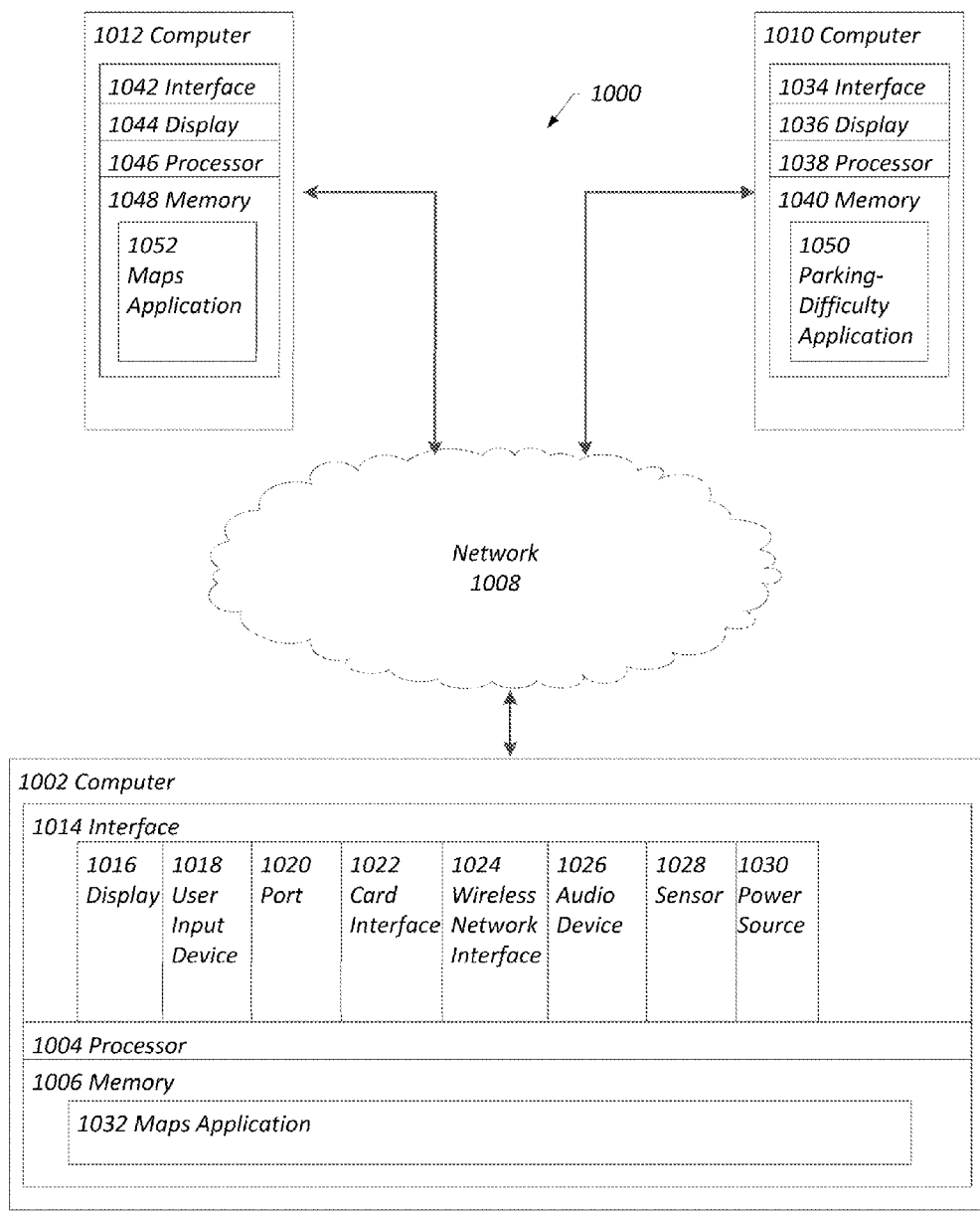
FIG. 10 is a block diagram of a system in accordance with embodiments of the present technique.

With these foregoing techniques in mind, a general description of an exemplary system for performing these techniques is described below. FIG. 10 is a block diagram of a system 1000 that depicts various components that may be present in computers suitable for use with the present techniques. These types of computers, and other computers providing comparable capabilities, may be used in conjunction with the present techniques. The system 1000 may include a computer 1002, e.g., a portable computer or vehicle navigation system, having a processor 1004 and memory 1006. The computer 1002 may communicate over a network 1008. Additionally, the system 1000 may include other computers, e.g., computers 1010 and 1012, also in communication with the network 1008. Thus, the computer 1002 and the computers 1010 and 1012 may communicate with each other over the network 1008.

The computer 1002 may include various internal and external components that contribute to the function of the device and which may allow the computer 1002 to function in accordance with the techniques discussed herein. As will be appreciated, various components of computer 1002 may be provided as internal or integral components of the computer 1002 or may be provided as external or connectable components. It should further be noted that FIG. 10 depicts merely one example of a particular implementation and is intended to illustrate the types of components and functionalities that may be present in computer 1002.

In various embodiments, the computer 1002 may be a media player, a cellular telephone, a computer such as a tablet computer, a personal data organizer, an e-book reader (e-reader), a vehicle navigation system, or the like. Thus, the computer 1002 may be a unified device providing any one of or a combination of the functionality of a media player, a cellular phone, a personal data organizer, and so forth. In addition, the computer 1002 may allow a user to connect to and communicate through the network 1008 and may provide communication over a satellite-based navigation system, such as the Global Positioning System. For example, the computer 1002 may allow a user to communicate using e-mail, text messaging, instant messaging, or using other forms of electronic communication, and may allow a user to view the location of the device in a geographic area, such as on an interactive map.

As mentioned above, the computer 1002 may include a processor 1004 and memory 1006. Additionally, the computer 1002 may include, for example, an interface 1014, a display 1016, an input device 1018, an input/output port 1020, a card interface 1022, a wireless network interface 1024, an audio device 1026, a sensor 1028, and a power source 1030.

The display 1016 may include a liquid crystal display (LCD), an organic light emitting diode (OLED) display, or a light emitting polymer display (LPD), although other display technologies may be used in other embodiments. The display 1016 may display a user interface (e.g., a graphical user interface). The display 1016 may also display various function and system indicators to provide feedback to a user, such as power status, call status, memory status, etc. These indicators may be in incorporated into the user interface displayed on the display 1016. In accordance with some embodiments, the display 1016 may include or be provided in conjunction with touch sensitive elements through which a user may interact with the user interface. Such a touch-sensitive display may be referred to as a "touch screen" and may also be known as or called a touch-sensitive display system.

The processor 1004 may provide the processing capability required to execute the operating system, programs, user interface, and functions of the computer 1002. The processor 1004 may include one or more microprocessors, such as one or more "general-purpose" microprocessors, a combination of general and special purpose microprocessors, and/or Application-Specific Integrated Circuits (ASICs). Additionally, the processor 1004 may include one or more reduced instruction set (RISC) processors, such as those implementing the Advanced RISC Machine (ARM) instruction set. Additionally, the processor 1004 may include single-core processors and multicore processors and may include graphics processors, video processors, and/or related chip sets.

The memory 1006 (which may include tangible non-transitory computer readable storage mediums) may include volatile memory and non-volatile memory accessible by the processor 1004 and other components of the computer 1002. The memory 1006 may store a variety of information and may be used for a variety of purposes. For example, the memory 1006 may store the firmware for the computer 1002, an operating system for the computer 1002, and any other programs or executable code necessary for the computer 1002 to function. In addition, the memory 1006 may be used for buffering or caching during operation of the computer 1002.

As mentioned above, the memory 1006 may include volatile memory, such as random access memory (RAM). The memory 1006 may also include non-volatile memory, such as ROM, flash memory, a hard drive, any other suitable optical, magnetic, or solid-state storage medium, or a combination thereof. The memory 1006 may store data files such as media (e.g., music and video files), software (e.g., for implementing functions on computer 1002), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable the computer to establish a wireless connection such as a cellular telephone connection), subscription information (e.g., information that maintains a record of podcasts or television shows or other media a user subscribes to), telephone information (e.g., telephone numbers), and any other suitable data.

The interface 1014 may include multiple interfaces and may couple various components of the computer 1002 to the processor 1004 and memory 1006. In some embodiments, the interface 1002, the processor 1004, memory 1006, and one or more other components of the computer 1002 may be implemented on a single chip, such as a system-on-a-chip (SOC). In other embodiments, these components and/or their functionalities may be implemented on separate chips.

The computer 1002 also includes a user input device 1018 configured to control the computer 1002, such as by controlling a mode of operation, an output level, an output type, etc. For instance, the user input device 1018 may include a button to turn the computer 1002 on or off. In general, embodiments of the computer 1002 may include any number of user input devices 1018, including buttons, switches, a control pad, keys, knobs, a scroll wheel, a mouse, or any other suitable input structures. The input device 1018 may work with a user interface displayed on the computer 1002 to control functions of the computer 1002 or of other devices connected to or used by the computer 1002. For example, the input device 1018 may allow a user to navigate a displayed user interface or to return such a displayed user interface to a default or home screen.

The computer 1002 may also include an input and output port 1020 to allow connection of additional devices. For example, the port 1020 may be a headphone jack that provides for connection of headphones. Additionally, the port 1020 may have both input/output capabilities to provide for connection of a headset (e.g. a headphone and microphone combination). Embodiments may include any number of input and/or output ports 1020, including headphone and headset jacks, universal serial bus (USB) ports, Firewire or IEEE-1394 ports, and AC and/or DC power connectors. Further, the computer 1002 may use the input and output ports to connect to and send or receive data with any other device, such as other portable computers, personal computers, printers, etc. For example, in one embodiment the computer 1002 may connect to a personal computer via a USB connection to send and receive data files, such as applications, media files, etc.

The computer 1002 depicted in FIG. 10 also includes a card interface 1022. The card interface 1022 may receive expansion cards that may be used to add functionality to the computer 1002, such as additional memory, I/O functionality, or networking capability. The expansion card may connect to the computer 1002 through any type of connector and may be accessed internally or externally to the computer 1002. For example, in one embodiment the card may be a flash memory card, such as a SecureDigital (SD) card, mini- or microSD, CompactFlash card, Multimedia card (MMC), etc. Additionally, in some embodiments the card interface 1022 may receive a Subscriber Identity Module (SIM) card, for use with an embodiment of the computer 1002 that provides mobile phone capability, such as over the network 1008.

The computer 1002 depicted in FIG. 10 also includes a wireless network interface 1024, such as a network interface card (NIC), wireless (e.g., radio frequency) receivers, etc. For example, the wireless network interface 1024 having may receive and send electromagnetic signals and communicate with communications networks and other communications devices via the electromagnetic signals. The wireless network interface 1024 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The wireless network interface 1024 may communicate with networks (e.g., network 1008), such as the Internet, an intranet, a cellular telephone network, a wireless local area network (LAN) and/or a metropolitan area network (MAN), and/or other devices by wireless communication. The wireless communication may use any suitable communications standard, protocol and/or technology, including Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), and/or Short Message Service (SMS), or any other suitable communication protocol.

The audio device 1026 provides an audio interface between a user and the computer 1002. In one embodiment, the audio device 1026 may include a speaker and may receive audio data, convert the audio data to an electrical signal, and transmit the electrical signal to the speaker. The audio device 1026 may also include a microphone and may receive electrical signals converted by the microphone from sound waves. The audio device 1026 may convert the electrical signal to audio data and transmits the audio data to the processor 1002 for processing. Audio data may also be retrieved from and transmitted to the memory 1006 and the wireless network interface 1024.

As shown in FIG. 10, the computer 1002 may also include a sensor 1028. The sensor 1028 may include a charge-coupled device (CCD) or complementary metal-oxide semiconductor (CMOS) phototransistors that, in conjunction with appropriate code executing on the processor 1002, may capture still images and/or video. The sensor 1028 may also include, for example, an accelerometer, such as for orientation, a magnetometer, and any other suitable type of sensor.

The computer 1002 may also include or be connected to a power source 1030. In one embodiment, the power source 1030 may be a battery, such as a Li-Ion battery. In such embodiments, the battery may be rechargeable, removable, and/or attached to other components of the computer 1002. Such battery-powered implementations may be highly portable, allowing a user to carry the computer 1002 while traveling, working, exercising, and so forth. In this manner, a user of the computer 1002, depending on the functionalities provided by the computer 1002, may listen to music, play games or video, record video or take pictures, place and take telephone calls, communicate with others, control other devices (e.g., the computer 1002 may include remote control and/or Bluetooth functionality, for example), and so forth while moving freely with the computer 1002. In addition, in certain embodiments the computer 1002 may be sized such that it fits relatively easily into a pocket or hand of the user (i.e., handheld). In such embodiments, the computer 1002 is relatively small and easily handled and utilized by its user and thus may travel with the user. Additionally, in certain embodiments the power source 1030 may be an external power source, such as a connection to AC power or DC power, and the computer 1002 may be connected to the power source 1030 via the input and output port 1020.

As mentioned above, the computer 1002 may execute various applications stored on the memory 1006 and executed on the processor 1004, such as a maps application 1032. The maps application 1032 may enable a user to view interactive maps of a geographic area, input destinations, and receive directions and navigation to the destination. Additionally, as mentioned above, parking difficulty for segments of a geographic area may be displayed on an interactive map of the maps application 1032, such as that illustrated above in FIG. 9. In some embodiments, the maps application may be Google Maps™ manufactured by Google, Inc., of Mountain View, Calif.

Turning now to the computers 1010 and 1012 depicted in FIG. 10, the computers 1010 and 1012 may also include various internal and external components that contribute to the function of the computers in accordance with the techniques discussed herein. As will be appreciated, various components of the computers 1010 and 1012 may be provided as internal or integral components of the computers 1010 and 1012 or may be provided as external or connectable components. It should further be noted that FIG. 10 depicts merely one example of a particular implementation and is intended to illustrate the types of components and/or functionalities that may be present the computers 1010 and 1012.

In various embodiments, the computers 1010 and 1012 may be, for example, a laptop computer, a desktop computer, a server, a tablet computer, a workstation, or the like. In some embodiments, the computer 1010 and/or the computer 1012 may represent multiple computers housed in a data processing center or a part of a distributed computing network. In such embodiments, applications executed on the computers 1010 and 1012 may divided and executed on multiple computers in series or parallel. The computers 1010 and 1012 may allow a user to connect to and communicate through the network 1008 (e.g., the Internet) or through other networks, such as local or wide area networks, and may also transmit data over a satellite-based navigation system, such as GPS.

As mentioned above, the computer 1010 may include an interface 1034, a display 1036, a processor 1038, and a memory 1040. Similarly, the computer 1012 may include an interface 1042, a display 1044, a processor 1046, and a memory 1048. The computers 1010 and 1012 may include various other components, such as the components of computer 1002 also depicted in FIG. 10 and described above. The interfaces 1034 and 1042 shown in FIG. 10 may include multiple interfaces and may couple various components of the computers 1010 and 1012 to the respective processors 1030 and 1046 and memories 1040 and 1048.

The displays 1036 and 1044 may include a liquid crystal display (LCD), an organic light emitting diode (OLED) display, or a light emitting polymer display (LPD), although other display technologies may be used in other embodiments. The displays 1036 and 1044 may display user interfaces (e.g., a graphical user interface or command line interface). The displays 1036 and 1044 may also display various function and/or system indicators to provide feedback to a user, such as power status, memory status, etc. These indicators may be in incorporated into the user interface displayed on the displays 1036 and 1044. In accordance with some embodiments, the displays 1036 and 1044 may include or be provided in conjunction with touch sensitive elements through which a user may interact with the user interface. Such a touch-sensitive display may be referred to as a "touch screen" and may also be known as or called a touch-sensitive display system.

The processors 1038 and 1046 may provide the processing capability required to execute the operating system, programs, user interface, and the respective computers 1010 and 1012. The processors 1038 and 1046 may each include one or more microprocessors, such as one or more "general-purpose" microprocessors, a combination of general and special purpose microprocessors, and/or ASICs. The processor 1004 may also include one or more reduced instruction set (RISC)

processors, such as those implementing the Advanced RISC Machine (ARM) instruction set. Additionally, the processors 1038 and 1046 may include single-core processors and multicore processors and may include graphics processors, video processors, and/or related chip sets.

The memories 1040 and 1048 (which may include tangible non-transitory computer readable storage mediums) may include volatile memory and non-volatile memory accessible by the processors 1010 and 1012 respectively and other components of the computers 1010 and 1012. The memories 1040 and 1048 may store a variety of information and may be used for a variety of purposes. For example, the memories 1040 and 1048 may store the firmware for the computers 1010 and 1012, operating systems for the computers 1010 and 1012 and/or any other programs or executable code necessary for the computers 1010 and 1012 to function. In addition, the memory 1004 may be used for buffering or caching during operation of the computers 1010 and 1012.

As mentioned above, the memories 1040 and 1048 may include volatile memory, such as random access memory (RAM). The memories 1040 and 1048 may also include non-volatile memory, such as ROM, flash memory, a hard drive, any other suitable optical, magnetic, or solid-state storage medium, or a combination thereof. The memories 1040 and 1048 may store data files such as media (e.g., music and video files), software (e.g., for implementing functions on computers 1010 and 1012), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish a wireless connection such as a telephone connection), subscription information (e.g., information that maintains a record of podcasts or television shows or other media a user subscribes to), telephone information (e.g., telephone numbers), and any other suitable data.

As mentioned above, the computer 1010 may execute various applications stored on the memory 1040 and executed on the processor 1038, such as a parking difficulty application 1050. The parking difficulty application 1050 may obtain data from multiple computers and determine the parking difficulty of segments of a geographic area, such as in the manner described above in FIGS. 2-6. For example, in some embodiments the memory 1040 may also store a database of location tracks, parking difficulty data, or both, or such data may be stored across multiple computers and memories. The parking difficulty data may be provided to another computer (e.g., computer 1002), such as over the network 1008.

Additionally, as also mentioned above, the computer 1012 may execute various applications stored on the memory 1048 and executed on the processor 1046, such as a maps application 1052. The maps application 1052 may enable a user to view interactive maps of a geographic area, input destinations, and receive directions to the destination. Additionally, as mentioned above, parking difficulty for segments of a geographic area may be displayed on an interactive map of the maps application 1052, such as that illustrated above in FIG. 9. In some embodiments, the maps application may be Google Maps™ manufactured by Google, Inc., of Mountain View, Calif. In some embodiments, the computer 1012 may be a part of a public or private organization for monitoring a geographic area, such as a city transportation management agency.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for determining parking difficulty, the method comprising:

receiving, at a processor, a plurality of location tracks for a respective plurality of vehicles, each of the plurality of location tracks comprising a plurality of segments of a geographic area traversed by a respective one of the plurality of vehicles;

determining, via the processor, a first index for each of the plurality of location tracks, the first index comprising a comparison of a first group of the plurality of segments and a second group of the plurality of segments of each of the plurality of location tracks;

selecting, via the processor, a group of the plurality of location tracks based on the first index;

determining, via the processor, a circle event for each of the group of the plurality of location tracks, the circle event corresponding to the traverse of at least one of the plurality of segments by a respective one of the plurality of vehicles;

counting, via the processor, a number of circle events that includes a first selected segment of the plurality of segments; and assigning, via the processor of the computer, a parking difficulty index for the first selected segment based on the number of circle events for the selected segment, the parking difficulty index representative of parking difficulty in the first selected segment.

2. The computer-implemented method of claim 1, wherein selecting, via the processor, a group of the plurality of location tracks based on the first index comprises comparing the first index to a threshold.

3. The computer-implemented method of claim 1, wherein the first group of segments comprises a total number of the plurality of segments and the second group of segments comprises a number of the plurality of segments traversed at least twice by the respective one of the plurality of vehicles.

4. The computer-implemented method of claim 3, wherein determining, via the processor of the computer, the first index for each of the plurality of location tracks comprises computing the fraction of the second group divided by the first group.

5. The computer-implemented method of claim 1, comprising counting, via the processor of the computer, a second number of circle events that includes a second selected segment of the plurality of segments.

6. The computer-implemented method of claim 5, wherein the first selected segment and the second selected segment exclude a last segment of the plurality of segments.

7. The computer-implemented method of claim 1, wherein each of the plurality of segments comprises a portion of a street of the geographic area.

8. The computer-implemented method of claim 7, wherein the portion comprises a portion corresponding to one city block.

9. The computer-implemented method of claim 1, comprising transmitting, over a network coupled to the processor, the parking difficulty index to a computer for display on a display of the computer.

10. The computer-implemented method of claim 1, wherein assigning, via the processor of the computer, a parking difficulty index comprises normalizing the number of circle events to a total number of the plurality of location tracks that include the first segment.

11. A non-transitory tangible computer-readable storage medium having executable computer code stored thereon, the code comprising a set of instructions that, when executed by a processor, causes the computer to:

receive, at a processor, a plurality of location tracks for a respective plurality of vehicles, each of the plurality of location tracks comprising a plurality of segments of a geographic area traversed by a respective one of the plurality of vehicles;

determine, via the processor, a first index for each of the plurality of location tracks, the first index comprising a comparison of a first group of the plurality of segments and a second group of the plurality of segments of each of the plurality of location tracks;

select, via the processor, a group of the plurality of location tracks based on the first index;

determine, via the processor, a circle event for each of the group of the plurality of location tracks, the circle event corresponding to the traverse of at least one of the plurality of segments by a respective one of the plurality of vehicles;

count, via the processor, a number of circle events that includes a first selected segment of the plurality of segments; and assign, via the processor of the computer, a parking difficulty index for the first selected segment based on the number of circle events for the selected segment, the parking difficulty index representative of parking difficulty in the first selected segment.

12. The non-transitory computer-readable storage medium of claim 11, the computer code comprising a set of instructions that, when executed by a computer, causes the computer to: select, via the processor, a group of the plurality of location tracks based on the first index by comparing the first index to a threshold.

13. The non-transitory computer-readable storage medium of claim 11, wherein the first group of segments comprises a total number of the plurality of segments and the second group of segments comprises a number of the plurality of segments traversed at least twice by the respective one of the plurality of vehicles.

14. The non-transitory computer-readable storage medium of claim 11, the computer code comprising a set of instructions that, when executed by a computer, causes the computer to count, via the processor of the computer, a second number of circle events that includes a second selected segment of the plurality of segments.

15. A computer-implemented method for determining parking difficulty, comprising:

determining, via a processor, a first plurality of location tracks of a first plurality of vehicles, the first plurality of location tracks comprising a first plurality of segments of a geographic area traversed by the first plurality of vehicles over a first duration;

storing the first plurality of location tracks on a memory accessible by the processor;

determining, via the processor, a second plurality of location tracks of a second plurality of vehicles, the second plurality of location tracks comprising a second plurality of segments of the geographic area traversed by the second plurality of vehicles over a second duration, the second plurality of segments including one or more of the first plurality of segments;

storing the second plurality of location tracks on the memory accessible by the processor; and determining, via the processor, a parking difficulty index for a segment included in the first plurality of segments and second plurality of segments based on the first plurality of location tracks and the second plurality of location tracks.

16. The computer-implemented method of claim 15, wherein the first duration comprises a plurality of hours, a plurality of days, or a plurality of weeks, and wherein the second duration comprises a plurality of hours, a plurality of days, or a plurality of weeks.

17. The computer-implemented method of claim 15, comprising transmitting, via a network coupled to the processor, the parking difficulty index to a computer for display on the computer.

* * * * *